United States Patent [19]
Isringhausen

[11] Patent Number: 5,335,686
[45] Date of Patent: Aug. 9, 1994

[54] STEAM TRAP

[76] Inventor: Carl L. Isringhausen, 11723 N. Briarpatch Dr., Midlothian, Va. 23113

[21] Appl. No.: 107,982

[22] Filed: Aug. 18, 1993

[51] Int. Cl.⁵ .............................. F17D 1/16; F16K 1/00
[52] U.S. Cl. ...................................... 137/14; 137/883; 137/887; 137/549; 137/269
[58] Field of Search ............... 137/883, 14, 269, 887, 137/549; 73/29.04, 861.04

[56] References Cited

U.S. PATENT DOCUMENTS

| | | | |
|---|---|---|---|
| 144,565 | 11/1873 | Roos | 137/883 |
| 2,342,050 | 2/1944 | Hurst | 137/887 |
| 3,707,161 | 12/1972 | Crawford | 137/269 |
| 3,715,870 | 2/1973 | Guzick | 55/466 |
| 3,853,144 | 12/1974 | Whelan | 137/883 |
| 3,877,895 | 4/1975 | Wonderland et al. | 55/97 |
| 4,426,213 | 1/1984 | Stavropoulos | 55/466 |
| 4,541,456 | 9/1985 | Troy | 137/886 |
| 5,137,556 | 8/1992 | Koulogeorgas | 137/549 |
| 5,183,078 | 2/1993 | Sorrell | 137/883 |

Primary Examiner—A. Michael Chambers
Attorney, Agent, or Firm—Shoemaker and Mattare, Ltd.

[57] ABSTRACT

A steam system is provided with a steam trap including a Y-fitting having a single fluid inlet, a primary outlet for returning water to a boiler, and a secondary outlet for testing only, and a main valve in series with the primary outlet. Connected to the secondary outlet are an auxiliary valve and a replaceable test jet downstream of the auxiliary valve, the test jet terminating the auxiliary branch. Test jets of various sizes may be installed, and outflow through each visually observed or measured, until an optimum size is arrived at. A main jet of a corresponding size is then installed in the main valve.

5 Claims, 4 Drawing Sheets

STEAM TRAP

BACKGROUND OF THE INVENTION

This invention relates generally to pipe fitting, and more particularly to an improved steam trap for removing condensate from steam lines.

The inverted bucket condensate traps of older systems were replaced by fixed-orifice devices, exemplified by U.S. Pat. 3,715,870 and 3,877,895, placed directly in a steam line, to separate water from steam, and let mainly the water only return to a boiler. The orifice size, even if specified correctly initially, may change over the years due to corrosion. By that time, the manuals may have been lost, so trial and error is necessary to find the correct orifice size. Too large or too small an orifice results in system inefficiency. The need to change orifices was addressed by U.S. Pat. No. 4,426,213, which provided a standard device into which various-sized inserts could be installed. While this represented an improvement over fixed orifice plates, it was necessary to disassemble the steam line in order to change inserts.

To avoid the need to separate the steam line in order to install a new fitting, it was later proposed to include a ball valve in the system, and place a removable jet or orifice in the ball. A plug was provided in the valve housing so that, with the valve temporarily closed, the jet could be removed and replaced, without having to break down the line. Even with this arrangement, though, some experimentation was required, since one could not see flow through the valve, and had to make measurements of some kind, with the system stabilized, in order to determine whether the proper sized jet had been installed at each location.

Since large systems may have such orifices at hundreds of locations, it is important to make fitting an orifice a simple matter requiring a minimum of experimentation and labor.

SUMMARY OF THE INVENTION

An object of the invention is to simplify the replacement of orifice devices as steam traps in a steam system.

Another object of the invention is to improve worker safety by reducing the likelihood of accidental exposure to live steam while replacing or checking orifice-type traps.

A further object of the invention is to reduce or eliminate downtime of a steam system during orifice replacement.

Yet another object is to enable one to observe fluid flow through an auxiliary orifice, so that the proper size orifice can be determined before a main orifice is replaced.

These and other objects are attained by providing a steam system with a steam trap including a Y-strainer fitting having a single fluid inlet, a primary outlet for water and particulate matter, and a secondary outlet, and a main valve in series with the primary outlet. The other branch of the "Y" includes an auxiliary valve and a replaceable test jet downstream of the auxiliary valve, the test jet terminating the auxiliary branch. Test jets of various sizes may be installed, and flow visually observed exiting through each, until an optimum size is arrived at, and then a main jet of a corresponding size is installed in the main valve.

BRIEF DESCRIPTION OF THE DRAWINGS

In the accompanying drawings.

DESCRIPTION OF THE PREFERRED EMBODIMENT

Figure 3:
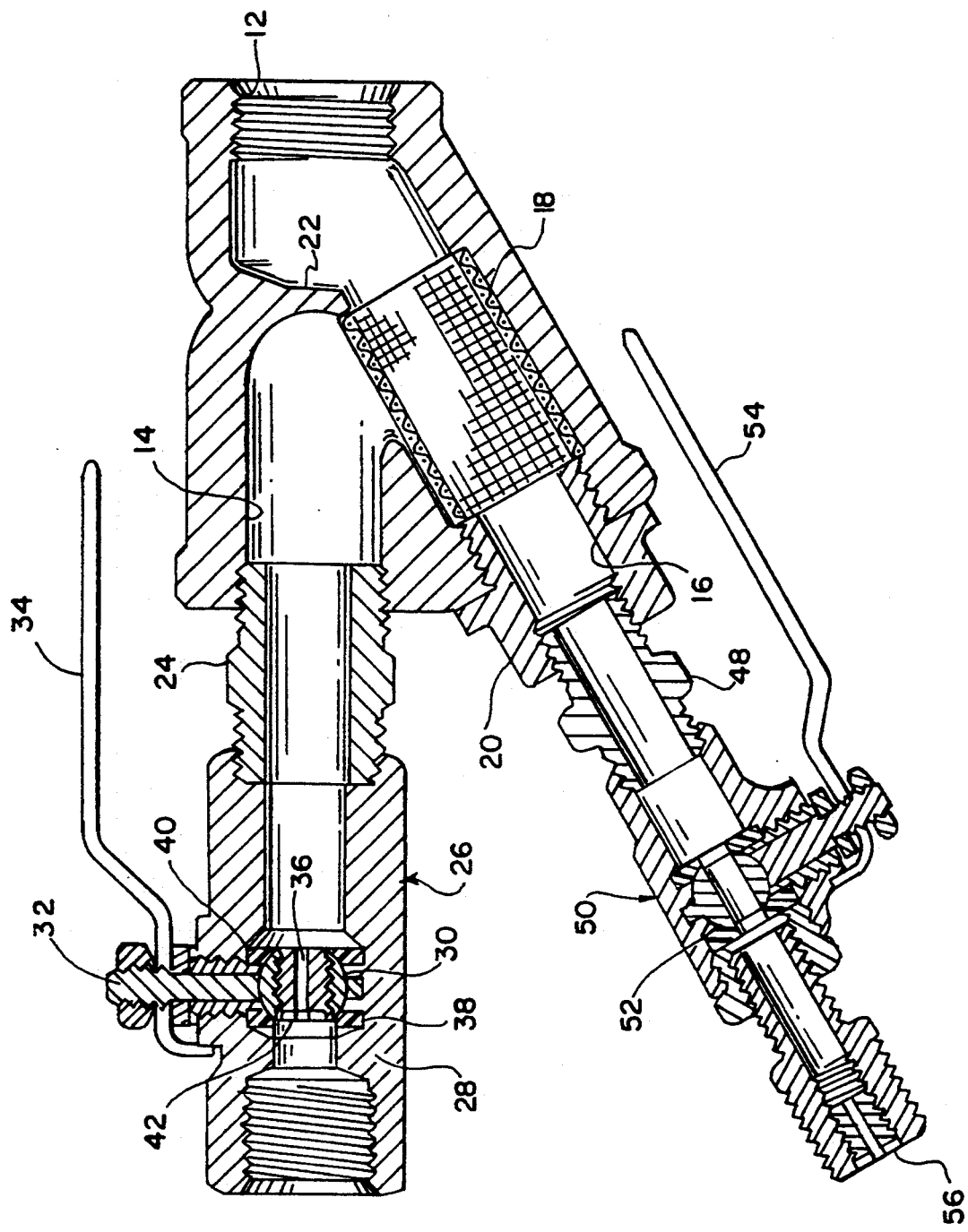
FIG. 3 is a sectional view along the plane 3 - 3 in FIG. 2.

An improved steam trap embodying the invention includes a conventional Y-strainer fitting 10 having an inlet 12, a primary outlet 14, and a secondary outlet 16. See FIG. 3, which illustrates a sleeve 18 of wire screen material retained by a reducer 20 in the primary outlet. In conventional use, this screen separates particulate matter, and also provides a collection locus for water droplets, while a baffle 22 partially blocks the primary flowpath.

Figure 1:
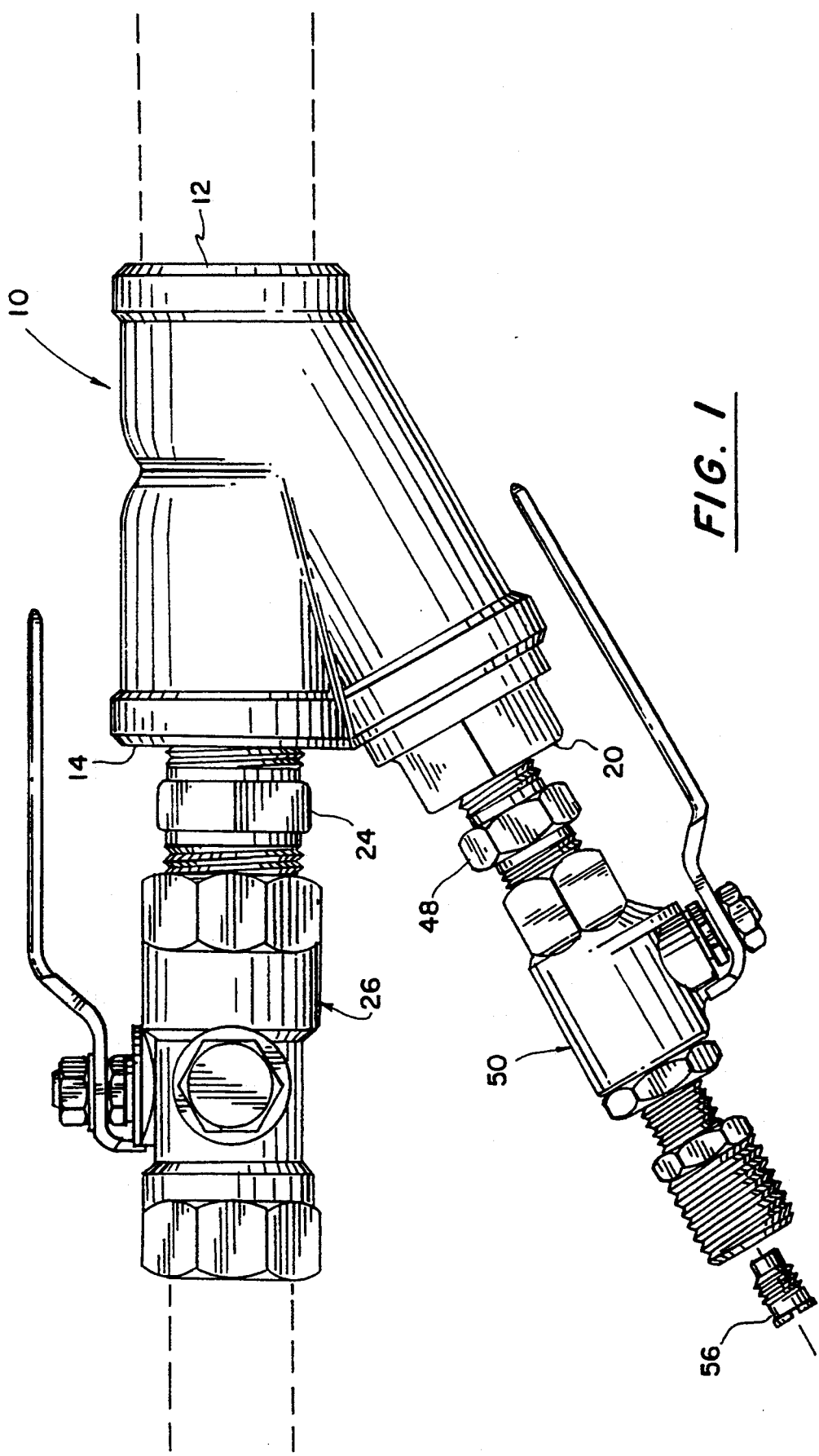
FIG. 1 is a side elevation of a steam trap embodying the invention.
Figure 2:
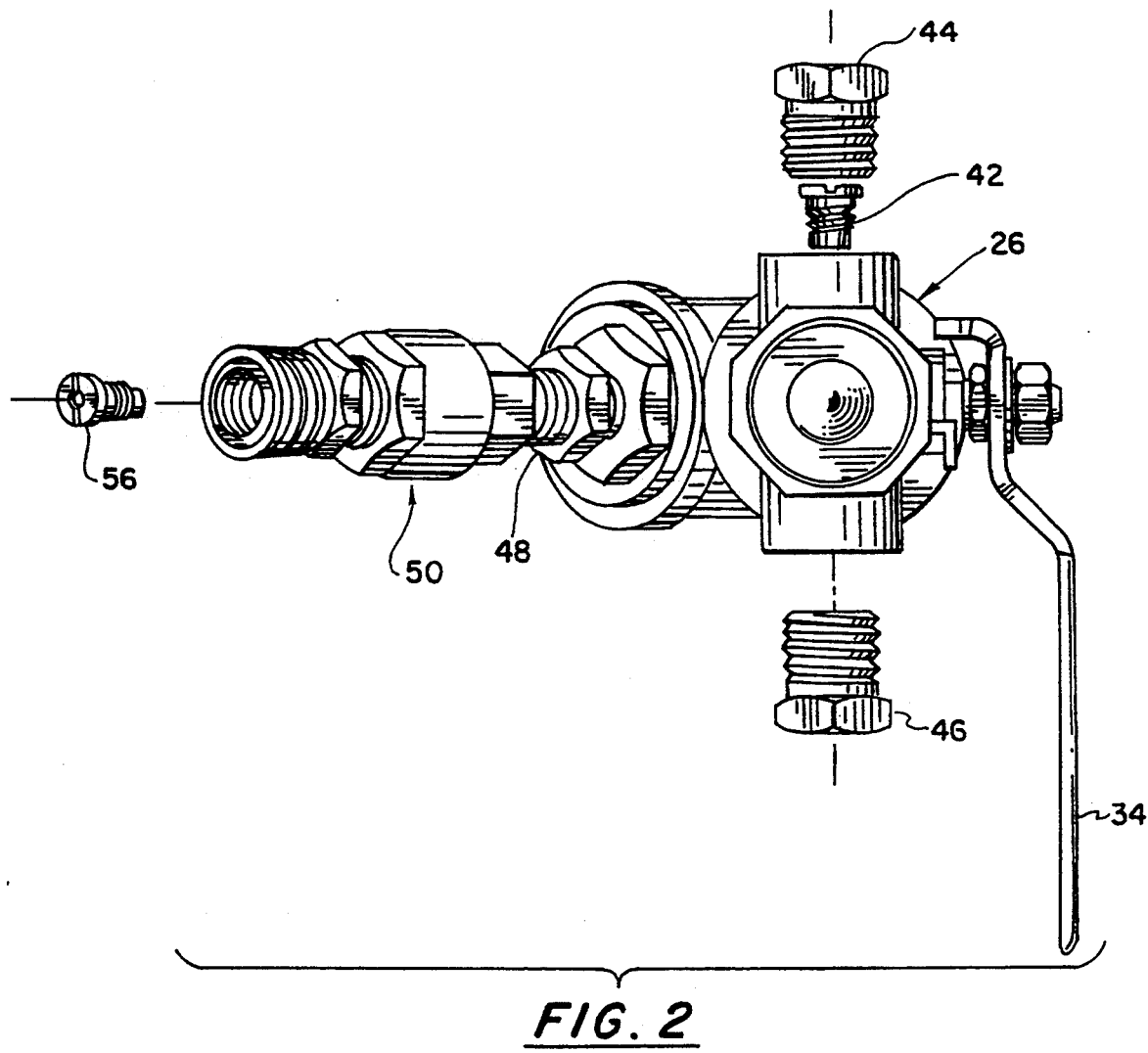
FIG. 2 is an end view thereof, from the downstream direction.

A first nipple 24 connects the primary outlet to a main ball valve 26. This valve comprises a housing 28 with a flowpath passing axially through it, and a ball element 30 connected to an actuator shaft 32. A handle 34 is affixed to the exposed end of the shaft, for turning the ball between an open position and a closed position. In the open position, a fluid path 36 through the ball is aligned with the flowpath, while in the closed position, it is perpendicular to the flowpath, and isolated from it by the seals 38,40. Actually, the fluid path 36 extends through a main removable orifice or jet 42 installed in the ball. As FIGS. 1 and 2 show, there are plugs 44,46 on either side of the ball, on an axis orthogonal to both the housing axis and the shaft axis. With the main valve closed, one of these plugs may be removed to gain access to the main jet, which then can be removed easily, safely, and without losing steam from the system. Thus, there is no need to shut the system down in order to change main jets. The main valve is normally open, except during such replacement.

The other arm of the "Y" includes a second nipple 48, installed in the reducer 20. This nipple supports an auxiliary valve 50, which may be a conventional ball valve containing an apertured ball 52 turned between on and off positions by a handle 54. A test orifice or jet 56 is installed in the distal end of a reducer threaded into one end of the auxiliary valve.

Figure 4:
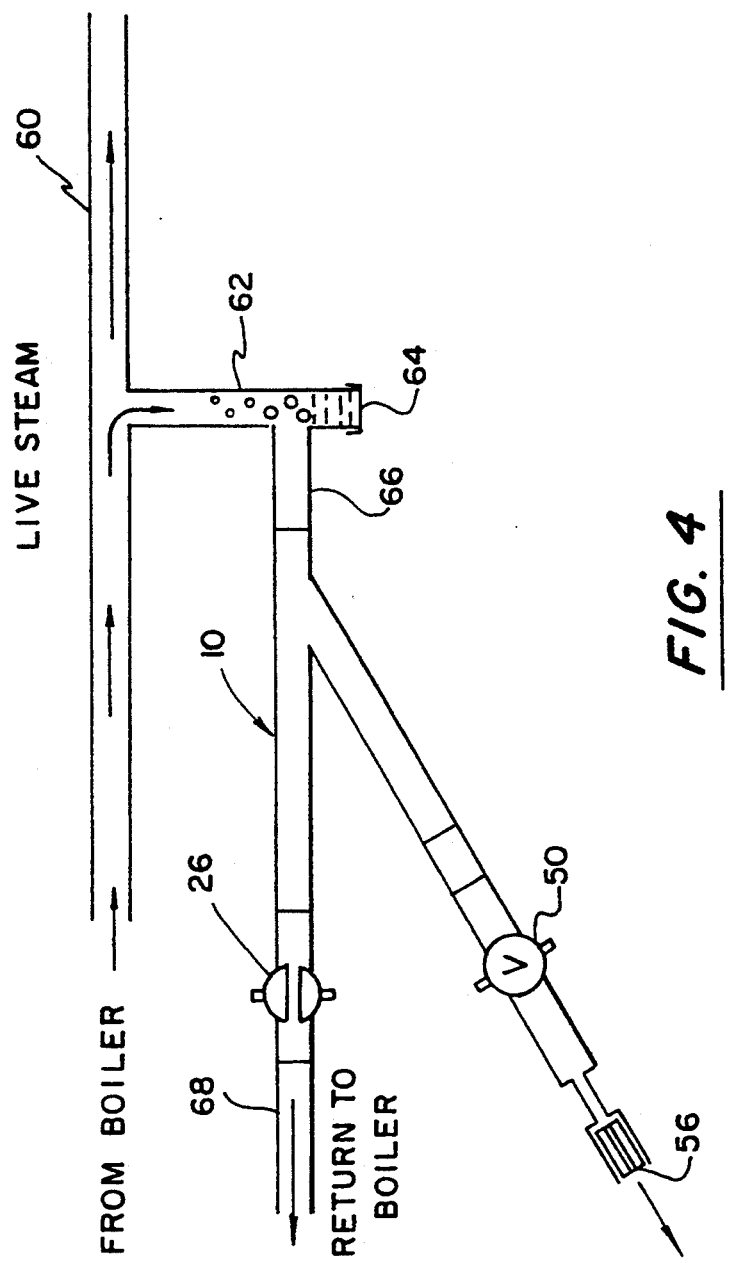
FIG. 4 is a diagram showing a portion of a steam system including the steam trap of FIG. 1.

FIG. 4 shows the device installed in a steam system. The live steam line, carrying steam from a boiler, is indicated by reference numeral 60. The steam trap would normally be installed at a low point in the line, to remove not only suspended droplets, but also water which has settled at the bottom of the pipe. Numeral 62 indicates a tee extending downward from the steam line. The lower arm of the tee is capped at 64, and the inlet 12 of the steam trap 10 is secured to the horizonal leg 66. With the system running, the main valve is fully open, and water passes to the boiler return line 68 through the main jet.

The auxiliary valve is normally closed, so one can replace the test jet simply by unscrewing it and installing a new one. This jet, normally inactive, is used only to facilitate proper sizing of the main jet in the main valve. With a trial test jet installed, the auxiliary valve is opened, and the fluid escaping from the jet is observed or measured. Ideally, only water is returned to the boiler, and yet water is prevented from accumulating in the steam line. In practice, the return of some steam can be tolerated. If too much steam flow is observed, however, the auxiliary valve is closed, the jet is replaced with a smaller one, and a new observation is made. If no steam is observed, it may be that a larger jet is indicated, so a new trial with a larger jet should be made. This process enables one quickly and safely to see which jet size is best. When the determination has been made, then the main jet in the main valve is replaced with one the same size as the test jet, or by the test jet itself.

Since the invention is subject to modifications and variations, it is intended that the foregoing description and the accompanying drawings shall be interpreted as illustrative of only one form of the invention, whose scope is to be measured by the following claims.

I claim:

1. A method of selecting a proper jet size for an orifice-type steam trap installed in a steam line, without disassembling the line, comprising steps of, providing said steam trap with a Y-fitting having an inlet, a primary outlet for normally returning water to a boiler, and a secondary outlet, a main valve connected to said primary outlet and an auxiliary valve connected to said secondary outlet, said main valve containing a replaceable main jet and said auxiliary valve having means for receiving a replaceable test jet in its outlet, and, with the steam line in normal service, installing a trial test jet in said auxiliary valve, then opening said auxiliary valve and closing said main valve, observing flow of steam and/or water through set test jet, making a determination whether the test jet size is sufficient to prevent collection of water in the steam line, yet sufficiently small to prevent substantial steam from passing through the steam trap, repeating the preceding four steps, if necessary, with test jets of different sizes, until said determination is positive, and then replacing said main jet with a jet the same size as the test jet which produced the positive determination.

2. An improved steam trap comprising a fitting having a single fluid inlet, a primary outlet for returning water to a boiler, and a secondary outlet for test purposes only, a main valve in series with said main outlet said valve comprising a housing containing a rotatable member having a replaceable main jet and a lateral plug in the housing through which the main jet can be removed or inserted when the valve is closed, and an auxiliary valve installed in series with said secondary outlet, and means for receiving a replaceable test jet downstream of said auxiliary valve, whereby test jets of various sizes may be installed, and flow through each observed or measured, until an optimum jet size is determined.

3. The invention of claim 2, wherein the auxiliary valve has a threaded outlet, and said receiving means is said threaded outlet.

4. The invention of claim 2, wherein said main valve is a ball valve containing a rotatable ball with a threaded bore for receiving said replaceable main jet.

5. A steam system comprising a live steam line carrying steam from a boiler, a return line for returning condensed water to the boiler, and a steam trap between the live steam line and the return line, for permitting primarily only water to enter said return line, wherein the steam trap comprises:

a fitting having a single fluid inlet, a primary outlet for returning water to a boiler, and a secondary outlet for test purposes only, a main valve in series with said main outlet, said valve comprising a housing containing a rotatable member having a replaceable main jet and a lateral plug in the housing through which the jet can be removed or inserted when the valve is closed, and an auxiliary valve installed in series with said secondary outlet, and means for receiving a replaceable test jet downstream of said auxiliary valve, whereby test jets of various sizes may be installed, and flow through each observed, until an optimum jet size is determined.

* * * * *